US008772707B2

(12) United States Patent
Mizutani et al.

(10) Patent No.: US 8,772,707 B2

(45) Date of Patent: Jul. 8, 2014

(54) QUADRUPOLE MASS SPECTROMETER

(75) Inventors: Shiro Mizutani, Kyoto (JP); Hiroshi Sugawara, Kyoto (JP)

(73) Assignee: Shimadzu Corporation, Kyoto-Shi (JP)

( * ) Notice: Subject to any disclaimer, the term of this patent is extended or adjusted under 35 U.S.C. 154(b) by 0 days.

(21) Appl. No.: 13/813,894

(22) PCT Filed: Aug. 6, 2010

(86) PCT No.: PCT/JP2010/063358

§ 371 (c)(1), (2), (4) Date: Mar. 5, 2013

(87) PCT Pub. No.: WO2012/017548

PCT Pub. Date: Feb. 9, 2012

(65) Prior Publication Data

US 2013/0200261 A1 Aug. 8, 2013

(51) Int. Cl.

| | |
|---|---|
| ***G06F 19/00*** | (2011.01) |
| ***G01N 19/10*** | (2006.01) |
| ***H01J 49/00*** | (2006.01) |
| ***H01J 49/36*** | (2006.01) |
| ***H01J 49/40*** | (2006.01) |

(52) U.S. Cl.

USPC ................................ 250/281; 702/32; 702/85

(58) Field of Classification Search

USPC .......................................................... 250/281

See application file for complete search history.

(56) References Cited

U.S. PATENT DOCUMENTS 4,008,388 A * 2/1977 McLafferty et al. ............ 702/27
4,611,305 A * 9/1986 Iwase ............................ 708/319
5,264,697 A * 11/1993 Nakagawa et al. ........... 250/291
5,506,799 A * 4/1996 Nakao ............................ 708/628
5,981,946 A * 11/1999 Mason ........................... 250/287

(Continued)

FOREIGN PATENT DOCUMENTS

JP 05332994 A 12/1993
JP 2002033075 A 1/2002
JP 2007323838 A 12/2007

OTHER PUBLICATIONS

Japanese language International search report Oct. 12, 2010 and its English language translation issued in corresponding PCT application PCT/JP2010/063358 cites the foreign patent documents listed above.

(Continued)

*Primary Examiner* — Phillip A Johnston
*Assistant Examiner* — Sean Luck
(74) *Attorney, Agent, or Firm* — Bingham McCutchen LLP

(57) ABSTRACT

As a control parameter given to a direct-current (DC) voltage generator which generates a DC voltage for ion selection, a "mass-related offset" for allowing an adjustment of the offset for each mass-to-charge ratio is provided in addition to the "gain" and "common offset" which respectively determine the gradient and position of a scan line drawn on a stability diagram during a mass-scan operation. In an automatic adjustment operation using a standard sample, under the control of an automatic regulator, the "gain" and "common offset" are initially set, after which the "mass-related offset" for each mass-to-charge ratio is determined so that the mass-resolving power will be substantially uniform, and these data are stored in a control data memory. In an analysis of a sample of interest, a quadrupole voltage controller controls the DC voltage generator and a radio-frequency (RF) voltage generator according to the control parameters read from the memory.

7 Claims, 5 Drawing Sheets

(56) References Cited

U.S. PATENT DOCUMENTS

| | | | | |
|---|---|---|---|---|
| 7,476,850 | B2 * | 1/2009 | Oonishi et al. | 250/287 |
| 2001/0050337 | A1 * | 12/2001 | Tanaka | 250/288 |
| 2003/0006924 | A1 * | 1/2003 | Roberts et al. | 341/152 |
| 2005/0080571 | A1 * | 4/2005 | Klee | 702/32 |
| 2005/0080578 | A1 * | 4/2005 | Klee | 702/85 |
| 2007/0029473 | A1 * | 2/2007 | Verentchikov | 250/281 |
| 2007/0158543 | A1 * | 7/2007 | Clowers et al. | 250/282 |
| 2008/0029697 | A1 * | 2/2008 | Willis et al. | 250/287 |
| 2008/0283742 | A1 * | 11/2008 | Takeuchi et al. | 250/288 |
| 2009/0167585 | A1 * | 7/2009 | Yeom | 341/155 |

OTHER PUBLICATIONS

Japanese language International preliminary report on patentability dated Apr. 16, 2013 and its English language translation issued in corresponding PCT application PCT/JP2010/063358 cites the foreign patent documents listed above.

* cited by examiner

Fig. 2
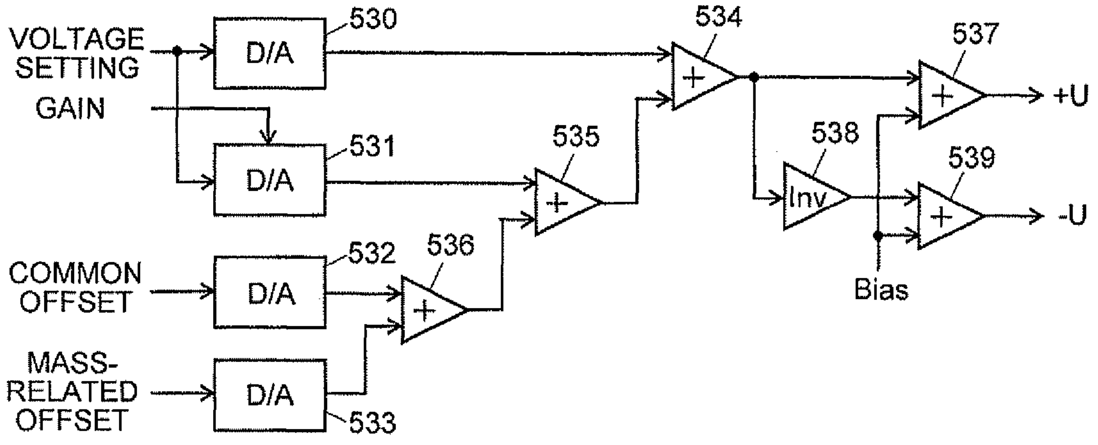
Fig. 3A
| | |
|---|---|
| GAIN | G |
Fig. 3B
| m/z | 10 | 500 | 1000 | 1500 | 2000 |
|---|---|---|---|---|---|
| MASS-RELATED OFFSET | Da | Db | Dc | Dd | De |
Fig. 3C
| SCAN SPEED [u/s] | 125 | 2500 | 7500 | 15000 |
|---|---|---|---|---|
| COMMON OFFSET | D1 | D2 | D3 | D4 |
Fig. 4
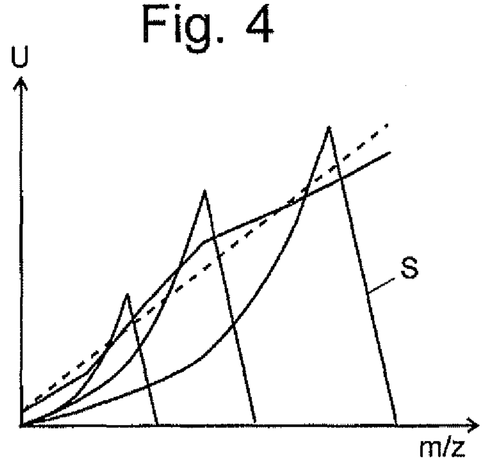

OFFSET ADJUSTMENT

GAIN ADJUSTMENT

RESOLVING POWER BEING LOW IN MIDDLE-MASS RANGE

RESOLVING POWER BEING TOO HIGH IN MIDDLE-MASS RANGE AND LOW IN HIGH-MASS RANGE

ALMOST IDEAL STATE

QUADRUPOLE MASS SPECTROMETER

TECHNICAL FIELD

The present invention relates to a quadrupole mass spectrometer using a quadrupole mass filter as a mass analyzer for separating ions originating from a sample according to their mass-to-charge ratio (m/z).

BACKGROUND ART

In a normal type of quadrupole mass spectrometer, various kinds of ions created from a sample are introduced into a quadrupole mass filter, which selectively allows only ions having a specific mass-to-charge ratio to pass through it. The selected ions are detected by a detector to obtain an intensity signal corresponding to the amount of ions.

As commonly known, a quadrupole mass filter normally consists of four rod electrodes arranged parallel to each other around an ion-beam axis, and a composite voltage composed of a direct-current (DC) voltage and a radio-frequency (RF) voltage (AC voltage) is applied to each of the four rod electrodes. The mass-to-charge ratio of the ions which are allowed to pass through a space extending along the ion-beam axis of the quadrupole mass filter depends on the RF voltage (amplitude) and the DC voltage applied to the rod electrodes. Accordingly, by appropriately setting the RF and DC voltages according to the mass-to-charge ratio of an ion to be analyzed, it is possible to selectively allow an intended kind of ion to pass through the filter and be detected. It is also possible to vary each of the RF and DC voltages applied to the rod electrodes over a predetermined range so that the mass-to-charge ratio of the ion passing through the quadrupole mass filter will change over a predetermined range, and to create a mass spectrum based on the signals produced by the detector during this process. This is the so-called scan measurement.

A detailed description of the voltage applied to the rod electrodes of the quadrupole mass filter is as follows. Normally, among the four rod electrodes, each pair of rod electrodes facing each other across the ion-beam axis are electrically connected. A voltage $U+V\cos\cdot\omega t$ is applied to one of the two pairs of rod electrodes, while a voltage $-U-V\cos\cdot\omega t$ is applied to the other pair of rod electrodes, where $\pm U$ and $\pm V\cos\cdot\omega t$ are the DC and RF voltages, respectively. A common DC bias voltage, which may additionally be applied to all the rod electrodes, is disregarded in the present discussion since this voltage basically does not affect the mass-to-charge ratio of the ions that can pass through the filter. For simplicity, the expressions "DC voltage U" and "RF voltage V" will hereinafter be used in place of the aforementioned, exact expressions of U being the voltage value of the DC voltage and V being the amplitude value of the RF voltage.

Normally, when the aforementioned scan measurement is performed, the voltages are controlled so that the voltage value U of the DC voltage and the amplitude value V of the RF voltage will be individually changed while maintaining their ratio (U/V) at a constant value (for example, see Patent Document 1). For example, in a conventional quadrupole mass spectrometer as described in Patent Document 2, the DC voltage U applied to the rod electrodes during the scan measurement is generated by converting voltage-setting data, which is sequentially given from a control CPU, into an analogue voltage by a digital-to-analogue converter. Therefore, the change in the DC voltage U with respect to a change in the mass-to-charge ratio will be approximately linear, as shown in FIG. 6B. Due to this relationship, the DC voltage U is used as a controlling factor for adjusting the mass-resolving power, which is one of the essential capabilities of mass spectrometers. The principle of this adjustment is hereinafter briefly described by means of FIGS. 7A and 7B, which are stability diagrams based on the stability condition for the solution of a Mathieu equation.

The stability region S, in which an ion can exist in a stable state in the quadrupole electric field surrounded by the rod electrodes (i.e. in which an ion can pass through the quadrupole mass filter without being dispersed during its flight), is a region surrounded by a nearly triangular frame as shown in FIGS. 7A and 7B. With an increase in the mass-to-charge ratio, the stability region S increases its area, while moving in the same direction as the increasing direction of the mass-to-charge ratio (rightward). Basically, by changing the DC voltage U so that this voltage U is always included within the stability region S, it is possible to allow ions having desired mass-to-charge ratios to sequentially pass through the quadrupole mass filter. However, the mass-resolving power changes depending on the position at which the line L which shows the change in the DC voltage U with respect to the mass-to-charge ratio traverses the stability region S. This means that, in order to approximately maintain the mass-resolving power at the same level over the entire mass range, it is necessary to change the DC voltage U so that the line L traverses the same relative portion within the stability region S, which always has a similar shape while sequentially changing its position and area. A conventional method for addressing this problem is to regulate two parameters, "gain" and "offset", so as to control the linear change in the DC voltage U and thereby control the mass-resolving power.

Specifically, the "gain" is a parameter for varying the amount of change in the voltage U with respect to the amount of change in the mass-to-charge ratio. As shown in FIG. 7B, varying the "gain" changes the gradient of the line L which shows the relationship between the mass-to-charge ratio and the voltage U. On the other hand, the "offset" is a parameter for varying the absolute value of the voltage U at the beginning of the change (scan) of the mass-to-charge ratio. Varying the "offset" translates the line L showing the relationship between the mass-to-charge ratio and the voltage U along the axis of voltage U, as shown in FIG. 7A. Conventional quadrupole mass spectrometers have the function of automatically adjusting the two parameters during a calibration process using a standard sample so as to adjust the gradient and position of the line showing the relationship between the mass-to-charge ratio and the voltage U and thereby adjust the mass-resolving power.

In commonly used quadrupole mass spectrometers, the RF voltage V is added to the DC voltage U via a coil and applied to the rod electrodes. As described in Patent Document 1, in many cases, the accuracy of the amplitude value of the RF voltage applied to the rod electrodes is ensured by means of a wave-detection circuit using a diode, by which an envelope of the RF voltage that has passed through the coil is extracted as a wave-detection signal, and the difference between the wave-detection signal and the objective voltage is fed back to an amplitude modulator used for generating the RF voltage. However, as pointed out in the aforementioned document, the output characteristic of the wave-detection circuit in some cases becomes curved, rather than linear, since the linear operation range of diodes used for wave detection is not wide enough. If the operation of the diode is extremely non-linear, the change in the RF voltage V with respect to the change in the mass-to-charge ratio may possibly become significantly curved, as shown in FIG. 6A.

The previous description about the mass-resolving power using the stability diagrams based on the Mathieu equation is only applicable in the case where the relationship between the RF voltage V and the mass-to-charge ratio is linear, similar to the relationship between the DC voltage U and the mass-to-charge ratio. If the relationship between the RF voltage V and the mass-to-charge ratio is non-linear, the uniformity of the mass-resolving power within a range of mass-to-charge ratio will deteriorate.

FIGS. 8A-8C are examples of actually measured mass spectra covering a range from a low mass (m/z168) to high mass (m/z1893) for different values of "gain" and "offset." In the example of FIG. 8A, in which the parameters were adjusted so that the mass-resolving power would improve in the high-mass range, the mass-resolving power deteriorated (i.e. the peaks were broader) in the middle-mass range (from m/z652 to m/z1225). In the example of FIG. 8B, in which the parameters were adjusted so that the mass-resolving power would improve in the middle-mass range, the mass-resolving power deteriorated in the high-mass range. Furthermore, although the mass-resolving power was high in the middle-mass range, the ion sensitivity in this range was considerably deteriorated. In the example of FIG. 8C, a diode capable of operating with high linearity was used in the wave-detection circuit, and the parameters were adjusted so that the mass-resolving power would be high over the entire mass range. This situation can be regarded as almost ideal. However, a diode with which this situation can be realized is difficult to procure and extremely expensive as compared to the normal type of diodes.

BACKGROUND ART DOCUMENT

Patent Document

Patent Document 1: JP-A 2002-33075
Patent Document 2: JP-A 2007-323838

SUMMARY OF THE INVENTION

Problem to be Solved by the Invention

The present invention has been developed in view of the previously described problems, and its primary objective is to provide a quadrupole mass spectrometer in which the uniformity in the mass-resolving power can be improved across the entire range of mass-to-charge ratio even if the linearity of the RF voltage applied to the quadrupole mass filter with respect to the mass-to-charge ratio is low.

Another objective of the present invention is to provide a quadrupole mass spectrometer in which a high degree of linearity of the mass-resolving power can be achieved over the entire range of mass-to-charge ratio without requiring manual operations by users.

Means for Solving the Problems

The present invention aimed at solving the previously described problem is a quadrupole mass spectrometer including: an ion source for ionizing a sample; a quadrupole mass filter composed of four rod electrodes; a quadrupole driver for producing a composite voltage composed of a direct-current voltage and a radio-frequency voltage corresponding to the mass-to-charge ratio of an ion to be allowed to pass through the quadrupole mass filter, and for applying the composite voltage to the quadrupole mass filter; and a detector for detecting an ion that has passed through the quadrupole mass filter, the quadrupole driver including:

a) a memory for storing voltage-setting data corresponding to the mass-to-charge ratio, for storing a gain, a common offset and a mass-related offset as control parameters for varying the direct-current voltage corresponding to the mass-to-charge ratio during a mass-scan operation, where the gain determines the ratio of the direct-current voltage to the amplitude of the radio-frequency voltage, the common offset determines a different offset voltage according to a scan speed, independently of the mass-to-charge ratio, and the mass-related offset specifies a different offset voltage for each of a plurality of mass-to-charge ratios within a mass-scan range; and b) a direct-current voltage generator for generating a direct-current voltage to be applied to the quadrupole mass filter by adding at least three voltages during a mass-scan operation, the three voltages including: a voltage generated by retrieving from the memory the voltage-setting data according to a change in the mass-to-charge ratio, performing a digital-to-analogue conversion of the voltage-setting data, and multiplying the resultant analogue signal by a gain retrieved from the memory; a voltage generated by a digital-to-analogue conversion of the common offset obtained from the memory according to a scan speed at that point in time; and a voltage generated by a digital-to-analogue conversion of the mass-related offset obtained from the memory according to the change in the mass-to-charge ratio.

In the quadrupole mass spectrometer according to the present invention, a different mass-related offset can be appropriately set for each of a plurality of mass-to-charge ratios within a mass-to-charge ratio range to be scanned, so as to change the offset component of the ion-selecting direct-current voltage applied to the quadrupole mass filter during each cycle of the mass-scan operation. As a result, the change in the direct-current voltage with respect to the change in the mass-to-charge ratio will be non-linear.

As already explained, when the wave-detection circuit for the feedback control of the radio-frequency voltage applied to the quadrupole mass filter has non-linear output characteristics, the change in the amplitude of the radio-frequency with respect to the change in the mass-to-charge ratio will inevitably be non-linear. In the present invention, the direct-current voltage can be controlled to change in a non-linear way similar to the aforementioned non-linear change in the amplitude of the radio-frequency voltage. That is to say, the characteristic of the change in the direct-current voltage with respect to the mass-to-charge ratio can be made to approximate to that of the change in the amplitude of the radio-frequency voltage. As a result, during the mass-scan operation, the scan line which shows the relationship between the radio-frequency voltage and the direct-current voltage will always pass through approximately the same relative position within the stability region based on a Mathieu equation, at whichever mass-to-charge ratio.

Effect of the Invention

Accordingly, in the quadrupole mass spectrometer according to the present invention, even if the wave-detection circuit for the feedback control of the radio-frequency voltage applied to the quadrupole mass filter has non-linear characteristics, the mass-resolving power can be made to be substantially uniform over the entire mass-to-charge ratio range to be scanned.

The quadrupole mass spectrometer according to the present invention may further include a regulator for supplying the ion source with a sample containing a known kind of component, for selecting each of a plurality of mass-to-charge ratios of the ions to be allowed to pass through the quadrupole mass filter, for monitoring the detection signal produced by the detector while varying the mass-related offset given to the direct-current voltage generator with the mass-to-charge ratio fixed at the selected value, and for determining a value of the mass-related offset for each of the mass-to-charge ratios so that the mass-resolving power will be substantially the same at any of the mass-to-charge ratios.

In this system, when a user (analysis operator) performs a simple operation, such as pressing a command button for executing automatic adjustment, the regulator automatically conducts an analysis of a standard sample (or the like) to determine the mass-related offset values which make the mass-resolving power substantially uniform at any of a plurality of predetermined mass-to-charge ratios, and the obtained values are stored in the memory. Naturally, it is also possible to simultaneously determine an appropriate value of the common offset for each of a plurality of scan speeds. Thus, in this system, the mass-resolving power can be automatically adjusted so as to be substantially uniform over the entire range of mass-to-charge ratio without requiring manual operations by users.

BRIEF DESCRIPTION OF THE DRAWINGS

FIG. 2 is a schematic block diagram of a direct-current voltage generator shown in FIG. 1.

FIGS. 3A-3C are tables showing an example of the control parameters for the generation of a direct-current voltage.

FIG. 4 is a chart showing a relationship between the mass-to-charge ratio and the direct-current voltage U in the quadrupole mass spectrometer of the present embodiment.

BEST MODE FOR CARRYING OUT THE INVENTION

Figure 1:
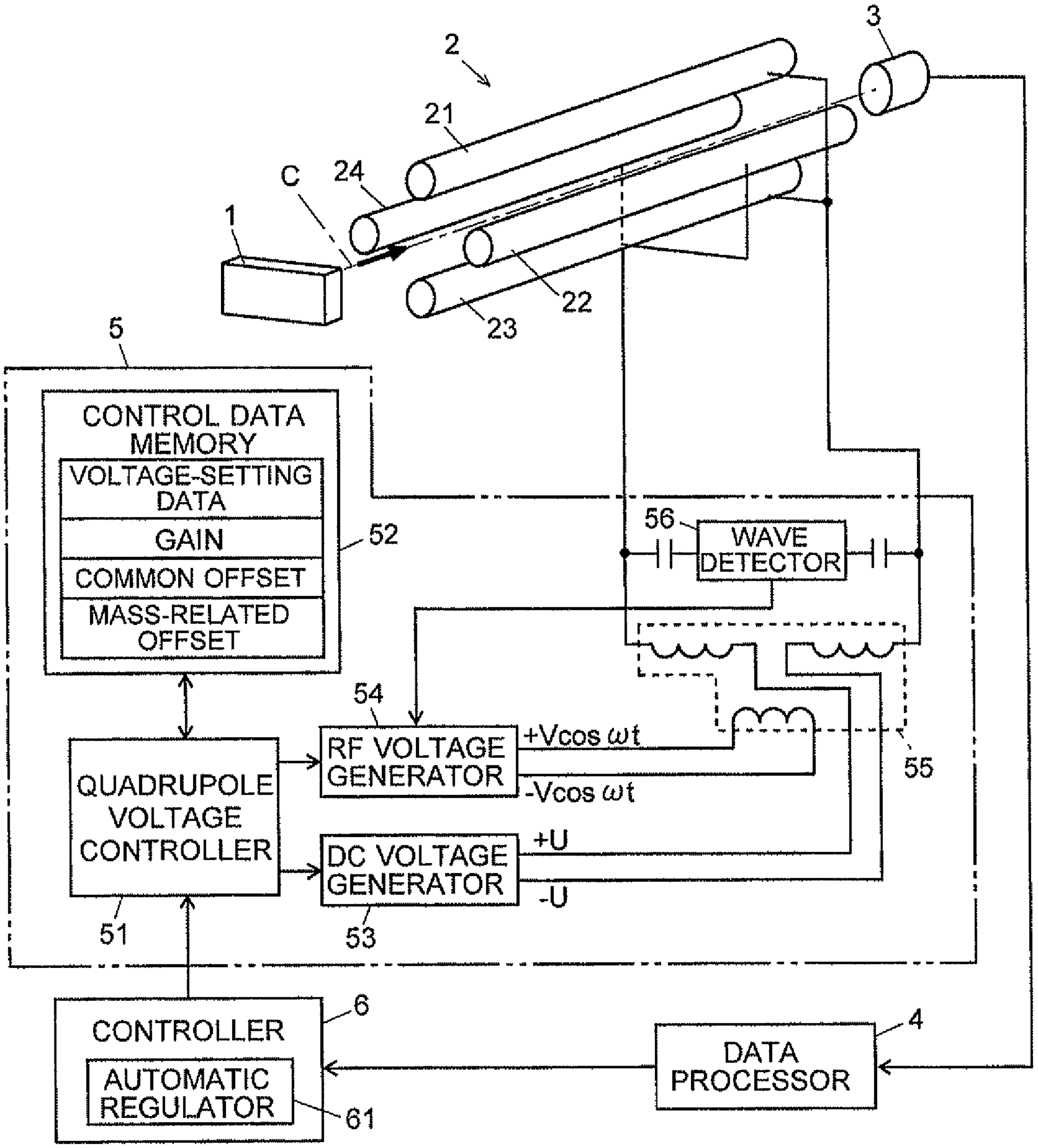
FIG. 1 is a configuration diagram showing the main components of a quadrupole mass spectrometer according to one embodiment of the present invention.

One embodiment of the quadrupole mass spectrometer according to the present invention is hereinafter described with reference to the attached drawings. FIG. 1 is a configuration diagram showing the main components of the quadrupole mass spectrometer according to the present embodiment. FIG. 2 is a schematic block diagram of a direct-current voltage generator shown in FIG. 1.

In the quadrupole mass spectrometer of the present embodiment, an ion source 1 ionizes the components of a sample. The produced ions are introduced into a space extending along the longitudinal axis of a quadrupole mass filter 2. Only the ions having a specific mass-to-charge ratio are allowed to pass through the quadrupole mass filter 2, to eventually reach and be detected by a detector 3. The quadrupole mass filter 2 consists of four rod electrodes 21, 22, 23 and 24 arranged parallel to each other in such a manner that they are in contact with the external side of a cylinder whose central axis lies on an ion-beam axis C. Each pair of the rod electrodes facing each other across the ion-beam axis C, i.e. the electrodes 21 and 23 or 22 and 24, are electrically connected, and a predetermined voltage i applied to each pair from a quadrupole driver 5.

The quadrupole driver 5 includes: a quadruple voltage controller 51 including a central processing unit (CPU) and other elements; a control data memory 52 for providing the quadruple voltage controller 51 with control data; a direct-current (DC) voltage generator 53 for generating two systems of DC voltages with opposite polarities, ±U, based on the data provided from the quadruple voltage controller 51; a radio-frequency (RF) voltage generator 54 for generating two RF voltages having a phase difference of 180 degrees (=π), ±V·cos ωt; a transformer 55 for adding the RF and DC voltages; and a wave-detector 56 including a diode and other elements for monitoring the RF voltages applied to the rod electrodes 21-24. In addition to the voltage-setting data provided for each of the mass-to-charge ratios included in the mass-to-charge ratio range to be measured by the present system, there are three control parameters, i.e. the “gain”, “common offset” and “mass-related offset”, stored in the control data memory 52.

The detection signal produced by the detector 3 is sent to a data processor 4 and converted into digital data to be subjected to various kinds of data processing, such as the creation of mass spectra. The results of the data processing are fed back to a controller 6, which is responsible for the general control of the present system. As will be described later, the controller 6 includes an automatic regulator 61 for automatically determining the data and the parameters to be stored in the control data memory 52. When conducting a mass spectrometric operation, it gives necessary commands to the quadrupole voltage controller 51.

As shown in FIG. 2, the DC voltage generator 53 includes: a first D/A converter 530 for converting the voltage-setting data into analogue voltage; a second D/A converter 531 for converting the voltage-setting data into analogue voltage and multiplying this voltage by a coefficient corresponding to a given “gain”; a third D/A converter 532 for converting a given value of the “common offset” into analogue voltage; a fourth D/A converter 533 for converting a given value of the “mass-related offset” into analogue voltage; an adder 536 for adding the analogue voltages outputted from the third and fourth D/A converters 532 and 533; an adder 535 for adding the analogue voltage outputted from the adder 536 and the analogue voltage outputted from the second D/A converter 531; an adder 534 for adding the analogue voltage outputted from the adder 535 and the analogue voltage outputted from the first D/A converter 530; an inverting amplifier 538 for inverting the polarity of the analogue voltage outputted from the adder 534; an adder 537 for adding a DC bias voltage Bias to the analogue voltage outputted from the adder 534; and an adder 539 for the DC bias voltage Bias to the analogue voltage outputted from the inverting amplifier 538.

Each of the D/A converters 530, 531, 532 and 533 has appropriate input-output characteristics. The adders 534, 535, 536, 537 and 539 do not necessarily simply add two inputs with a ratio of 1:1, but may add them with any appropriate ratio. They also have the function of adding a fixed value, as needed, to further shift the voltage level.

FIGS. 3A-3C are tables showing an example of the control parameters stored in the control data memory 52 in the quadrupole mass spectrometer of the present embodiment. The "gain" has a common value G. The "common offset" takes one of the different values D1, D2 and so on, for each of the scan speeds (there are four values in the present example: 125, 2,500, 7,500 and 15,000 [u/s]) specified as one of the conditions of the mass-scan operation. The "mass-related offset" takes one of the different values Da, Db and so on, for each of a plurality of mass-to-charge ratios selected within a predetermined mass-to-charge ratio range (there are five values in the present example: m/z 10, 500, 1,000, 1,500 and 2,000). These control parameters respectively have predetermined default values. However, using the default values does not always ensure that the voltages are appropriately applied to the quadrupole mass filter 2 to fully provide the system performance. To address this problem, when a calibration using a standard sample is performed, the automatic regulator 61 determines the optimal values of the control parameters as follows.

In the automatic adjustment, a standard sample containing known kinds of components in known concentrations is continuously introduced into the ion source 1. The automatic regulator 61 sends the DC voltage generator 53 a command for setting the "gain" and "common offset" to the respective default values. Then, with the scan speed set at the lowest level (125 [u/s] in the present example), the mass-scan operation is repeated while the "gain" is gradually changed from the default value. The automatic regulator 61 receives from the data processor 4 information relating to the intensity of the signal obtained for a predetermined kind of component in this mass-scan operation, detects the optimal value of the "gain" at which the signal intensity is maximized, and stores this value as G in the control data memory 52. Subsequently, with the "gain" set at G, the "common offset" is gradually changed from the default value. During this process, the automatic regulator 61 detects the optimal value of the "common offset" for the lowest scan speed, and stores this value as D1 in the control data memory 52.

Next, with the "gain" set at G and the "common offset" set at D1, the "mass-related offset" is adjusted so that the mass-resolving power will be substantially equal at any of the aforementioned five mass-to-charge ratios. Specifically, when the mass-resolving power is lower than the optimal mass-resolving power, the "mass-related offset" should be decreased. Conversely, when the mass-resolving power is higher, the "mass-related offset" should be increased. Then, the values of the "mass-related offset" are adjusted so that the difference in the mass-resolving power at any of the aforementioned five mass-to-charge ratios will be within a predetermined acceptable range. The eventually obtained values are stored as Da-De in the control data memory 52.

Finally, the "gain" is set to G, and the "mass-related offset" values associated with the aforementioned mass-to-charge ratios are respectively set to Da-De, with a linear interpolation between the neighboring mass-to-charge ratios. Under these conditions, the scan speed is changed in a stepwise manner from 125, through 2,500 and 7,500, to 15,000, and the optimal value of the "common offset" is detected for each of the scan speeds equal to or higher than 2,500 [u/s]. The detected values are stored as D2, D3 and D4 in the control data memory 52.

As a result of the process described thus far, the tables of "gain", "common offset" and "mass-related offset" in the control data memory 52 are completely filled with the necessary values.

In the quadrupole mass spectrometer of the present embodiment, when an analysis of a sample of interest is performed, the controller 6 instructs the quadrupole voltage controller 51 of the mass-to-charge ratio range to be covered by the measurement and the scan speed which is either specified by a user or determined from the mass-to-charge ratio range to be covered by the measurement and/or other scan conditions. Based on this instruction, the quadrupole voltage controller 51 reads the "gain", the "common offset" for the specified scan speed, and the "mass-related offset" for the specified mass-to-charge ratio range from the control data memory 52. Then, the "gain" and the "common offset", which are fixed during the mass-scan operation, are given to the DC voltage generator 53, while the voltage-setting data, which are sequentially changed along with the change in the mass-to-charge ratio, are given to both the RF voltage generator 54 and the DC voltage generator 53. Furthermore, a series of offset values calculated by a linear interpolation of the "mass-related offset" values corresponding to a plurality of mass-to-charge ratios are sequentially given to the DC voltage generator 53 along with the change in the mass-to-charge ratio.

Figure 6A:
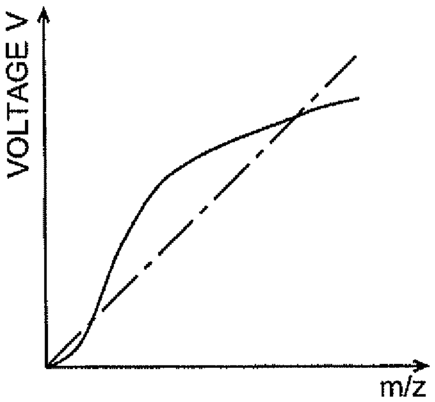
FIGS. 6A and 6B are graphs showing a relationship between the mass-to-charge ratio and the radio-frequency voltage V (FIG. 6A) and a relationship between the mass-to-charge ratio and the direct-current voltage U (FIG. 6B) in a conventional quadrupole mass spectrometer.
Figure 6B:
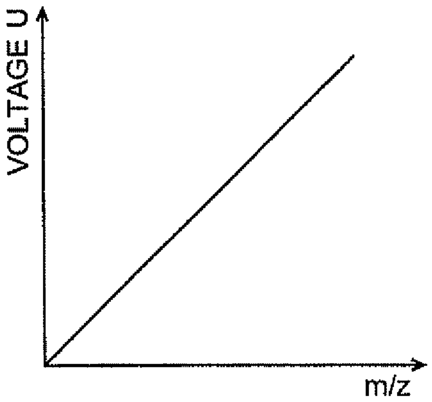
Figure 7A:
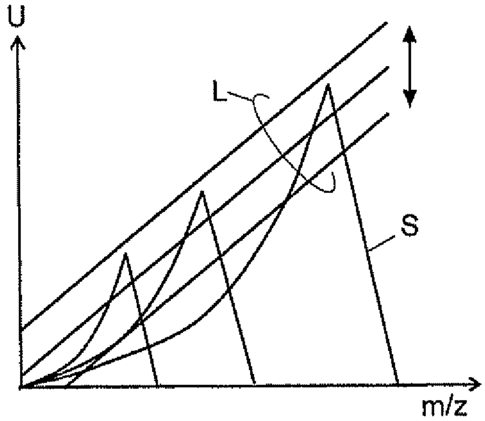
FIGS. 7A and 7B are charts each showing a relationship between the mass-to-charge ratio and the direct-current voltage U in the case where the gain or offset is adjusted in a conventional quadrupole mass spectrometer.
Figure 7B:
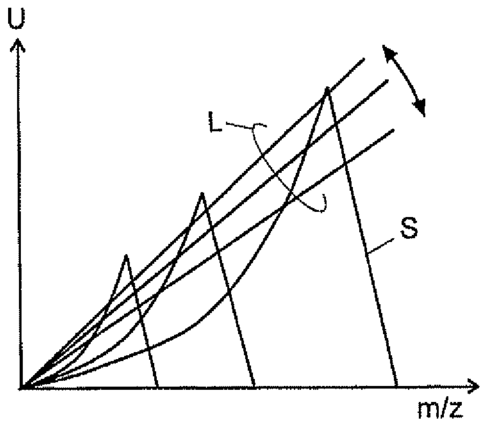
Figure 8A:
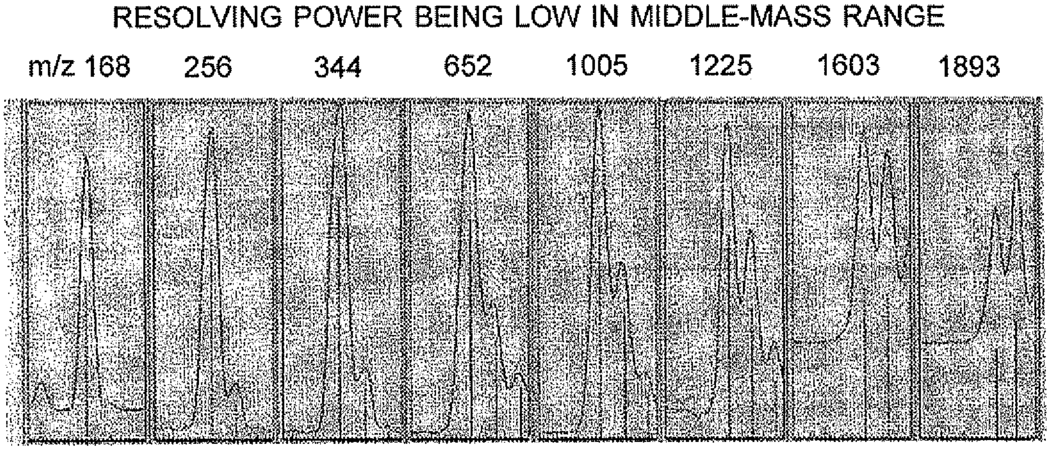
FIGS. 8A-8C are examples of actually measured mass spectra from a low-mass range to a high-mass range in a conventional quadrupole mass spectrometer.
Figure 8B:
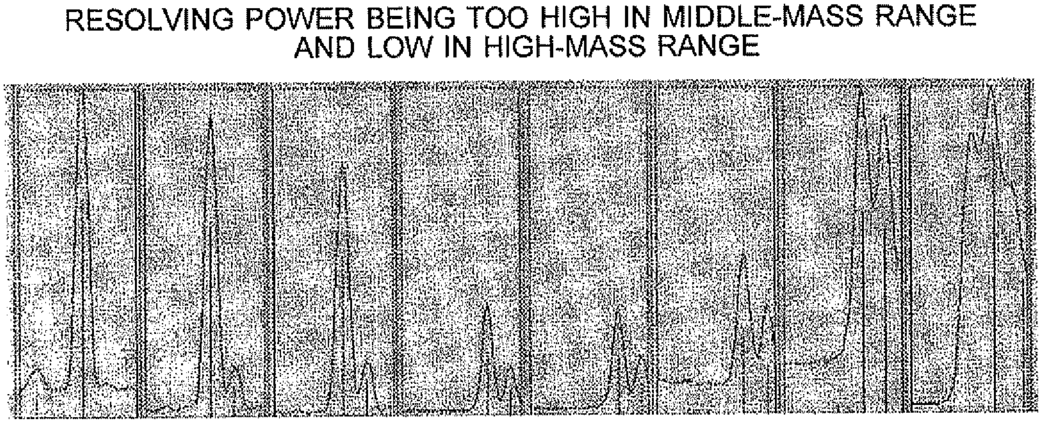
Figure 8C:
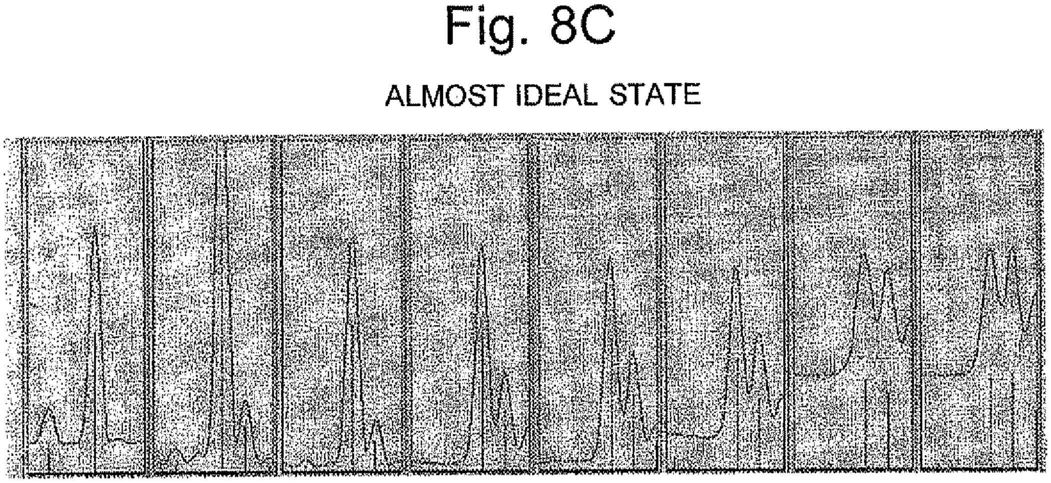

In the case of a conventional quadrupole mass spectrometer, since the offset voltage (which corresponds to the output of the adder 536 in FIG. 2) in the DC voltage ±U is independent of the mass-to-charge ratio, the relationship between the DC voltage U and the mass-to-charge ratio is linear, as shown by the dashed line in FIG. 4. By contrast, in the case of the quadrupole mass spectrometer of the present embodiment, the output voltage of the adder 536 is changed according to the mass-to-charge ratio, and this change is controlled so that the mass-resolving power will be substantially uniform, independently of the mass-to-charge ratio. Accordingly, when the change in the RF voltage V with respect to the mass-to-charge ratio is non-linear as shown in FIG. 6A, the DC voltage U will be changed in a similar polygonal-line pattern, as shown by the solid line in FIG. 4. This polygonal change in the DC voltage U is made to approximate to the curved change in the RF voltage V. Therefore, the non-uniformity in the mass-resolving power due to the non-linearity in the change of the RF voltage V will be reduced.

In the quadrupole mass spectrometer of the present embodiment, the change in the mass-resolving power due to a change in the scan speed is also very small, since the "common offset" is varied according to the scan speed. That is to say, in the quadrupole mass spectrometer of the present embodiment, the uniformity in the mass-resolving power is improved over the entire range of mass-to-charge ratios and at any scan speed. Since the control parameters for this operation are automatically adjusted, the analysis operator does not need to perform a manual adjustment or similar cumbersome work. There is almost no additional workload on the analysis operator.

Figure 5A:
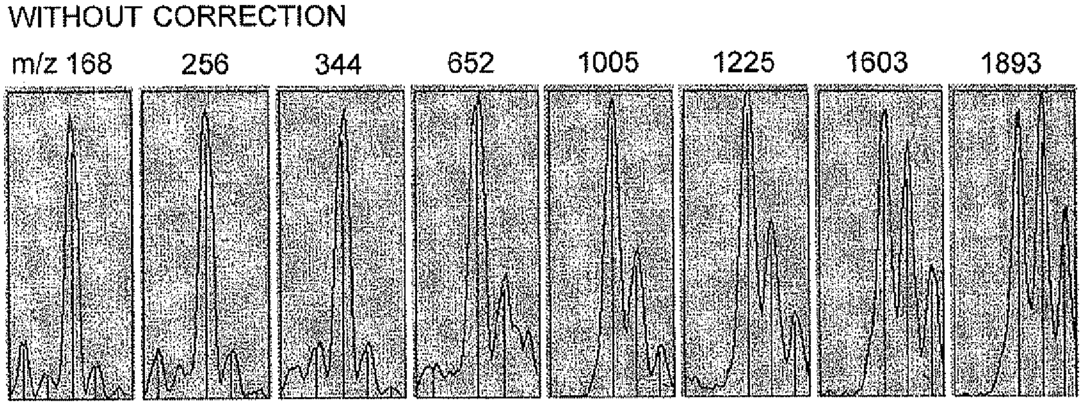
FIGS. 5A and 5B are examples of actually measured mass spectra, one of which was obtained with an offset correction performed for each mass-to-charge ratio and the other was obtained without that correction.
Figure 5B:
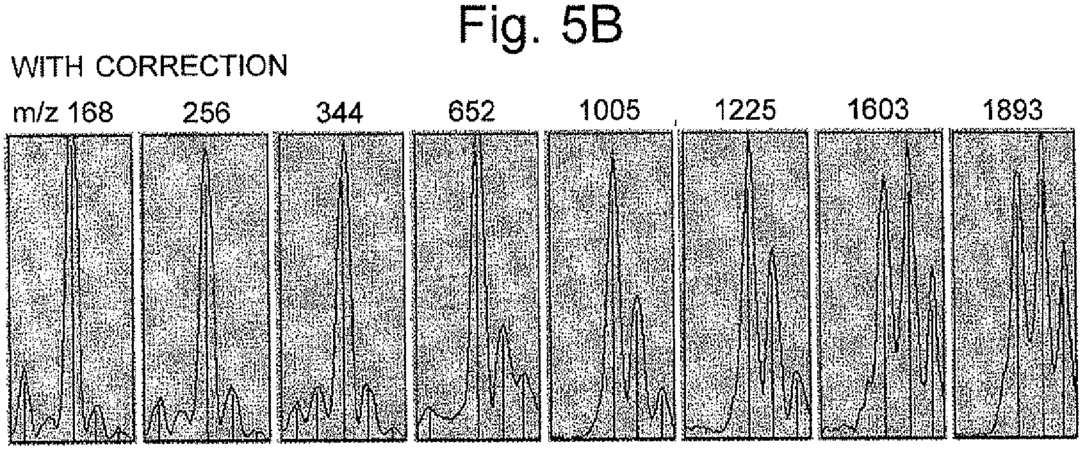

FIGS. 5A and 5B are examples of actually measured mass spectra covering a range from a low mass (m/z168) to a high mass (m/z1893) in the case where the mass-resolving power correction using the mass-related offset was performed (as in the present invention) or not performed (as in the conventional case). As can be seen in FIG. 5A, the mass-resolving power in the middle-mass range (around m/z652, m/z1005 and m/z1225) was rather low when the mass-resolving power was not corrected. On the other hand, when the mass-resolving power was corrected, the mass-resolving power in the middle-mass range was particularly improved, making the mass-resolving power more uniform over the entire mass range. A calculation by the present inventor based on the experimental result has demonstrated that the variation in the mass-resolving power can be restricted to ±10% or less over the entire mass range. An improvement in the mass accuracy was also confirmed.

It should be noted that the previously described embodiment is a mere example of the present invention, and any change, addition or modification appropriately made within the spirit of the present invention will evidently fall within the scope of claims of this patent application. For example, the internal block configuration of the DC voltage generator 53 shown in FIG. 2 is a mere example; for example, it may naturally be modified so that the two systems of signals are added or subtracted in a digital form before their digital-to-analogue conversion, rather than being added after the digital-to-analogue conversion. The settings of the tables of the control parameters shown in FIGS. 3A-3C may also be changed. For example, the values of the mass-to-charge ratios for which the "mass-related offset" is specified may be arbitrarily selected.

EXPLANATION OF NUMERALS

1 . . . Ion Source
2 . . . Quadrupole Mass Filter
21-24 . . . Rod Electrode
3 . . . Detector
4 . . . Data Processor
5 . . . Quadrupole Driver
51 . . . Quadrupole Voltage Controller
52 . . . Control Data Memory
53 . . . Direct-Current (DC) Voltage Generator
531, 532, 533 . . . Digital-to-Analogue (D/A) Converter
534, 535, 536, 537 . . . Adder
538 . . . Inverting Amplifier
54 . . . Radio-Frequency (RF) Voltage Generator
55 . . . Transformer
56 . . . Wave Detector
C . . . Ion-Beam Axis

The invention claimed is:

1. A quadrupole mass spectrometer comprising:
an ion source for ionizing a sample;
a quadrupole mass filter composed of four rod electrodes;
a quadrupole driver for producing a composite voltage, which comprises a direct-current voltage and a radio-frequency voltage corresponding to the mass-to-charge ratio of an ion to be allowed to pass through the quadrupole mass filter, and for applying the composite voltage to the quadrupole mass filter; and
a detector for detecting an ion that has passed through the quadrupole mass filter,
wherein the quadrupole driver comprises:
a) a memory for storing voltage-setting data corresponding to the mass-to-charge ratio and for storing a gain, a common offset and a mass-related offset as control parameters for varying the direct-current voltage corresponding to the mass-to-charge ratio during a mass-scan operation, where the gain determines the ratio of the direct-current voltage to the amplitude of the radio-frequency voltage, the common offset determines a different offset voltage according to a scan speed, independently of the mass-to-charge ratio, and the mass-related offset specifies a different offset voltage for each of a plurality of mass-to-charge ratios within a mass-scan range; and
b) a direct-current voltage generator for generating a direct-current voltage to be applied to the quadrupole mass filter by adding at least three voltages during a mass-scan operation, the three voltages including: a voltage generated by retrieving from the memory the voltage-setting data according to a change in the mass-to-charge ratio, performing a digital-to-analogue conversion of the voltage-setting data, and multiplying the resultant analogue signal by a gain retrieved from the memory; a voltage generated by a digital-to-analogue conversion of the common offset obtained from the memory according to a scan speed at that point in time; and a voltage generated by a digital-to-analogue conversion of the mass-related offset obtained from the memory according to the change in the mass-to-charge ratio.

2. The quadrupole mass spectrometer according to claim 1, further comprising a regulator for supplying the ion source with a sample containing a known kind of component, for selecting each of a plurality of mass-to-charge ratios of the ions to be allowed to pass through the quadrupole mass filter, for monitoring the detection signal produced by the detector while varying the mass-related offset given to the direct-current voltage generator with the mass-to-charge ratio fixed at a selected value, and for determining a value of the mass-related offset for each of the mass-to-charge ratios so that a mass-resolving power will be substantially the same at any of the mass-to-charge ratios.

3. The quadrupole mass spectrometer according to claim 1, wherein the quadrupole driver further comprises:
a radio-frequency voltage generator for generating two radio-frequency voltages having a phase difference of 180 degrees; and
a quadrupole voltage controller for reading the gain, the common, and the mass-related offset from the memory and sending these appropriately to the radio-frequency voltage generator and the direct-current voltage generator.

4. The quadrupole mass spectrometer according to claim 1, wherein the quadrupole driver further comprises:
a transformer for adding the radio-frequency and direct-current voltages; and
a wave detector for monitoring the radio-frequency voltage applied to the quadrupole mass filter.

5. The quadrupole mass spectrometer according to claim 1, wherein for each of the mass-to charge ratios, the mass-related offset is decreased or increased such that the values of the mass-related offset are adjusted so that the differences in mass-resolving power for any of the mass-to-charge ratios will be within a predetermined range.

6. The quadrupole mass spectrometer according to claim 1, wherein the direct-current voltage generator comprises:
a first D/A converter for converting the voltage-setting data into an analogue voltage;
a second D/A converter for converting the voltage-setting data into an analogue voltage and multiplying this voltage by a coefficient corresponding to a given gain;
a third D/A converter for converting a given value of the common offset into an analogue voltage; a fourth D/A converter for converting a given value of the mass-related offset into an analogue voltage;
a first adder for adding the analogue voltages outputted from the third and fourth D/A converters;
a second adder for adding the analogue voltage outputted from the first adder and the analogue voltage outputted from the second D/A converter;
a third adder for adding the analogue voltage outputted from the second adder and the analogue voltage outputted from the first D/A converter;
an inverting amplifier for inverting the polarity of the analogue voltage outputted from the third adder;

a fourth adder for adding a DC bias voltage Bias to the analogue voltage outputted from the third adder; and a fifth adder for the DC bias voltage Bias to the analogue voltage outputted m the inverting amplifier.

7. The quadrupole mass spectrometer according to claim 6, wherein the first, second, third, fourth, and fifth adders are able to add two inputs with a ratio of 1:1, but also to add them with any appropriate ratio; and the adders are also able to add a fixed value to further shift the voltage level.

* * * * *